United States Patent
Borschert et al.

(10) Patent No.: US 8,043,030 B2
(45) Date of Patent: Oct. 25, 2011

(54) TOOL HOLDER, DRILL HOLDER, REAMER HOLDER, AND MILLING CUTTER HOLDER

(75) Inventors: Bernhard Borschert, Bamberg (DE); Friedrich Oberländer, Neuhof/Zenn (DE)

(73) Assignee: Kennametal Inc., Latrobe, PA (US)

( * ) Notice: Subject to any disclaimer, the term of this patent is extended or adjusted under 35 U.S.C. 154(b) by 620 days.

(21) Appl. No.: 12/110,078

(22) Filed: Apr. 25, 2008

(65) Prior Publication Data

US 2009/0123240 A1     May 14, 2009

Related U.S. Application Data

(63) Continuation-in-part of application No. PCT/EP2006/008812, filed on Sep. 11, 2006.

(30) Foreign Application Priority Data

Oct. 27, 2005 (DE) .......................... 10 2005 051545

(51) Int. Cl.
*B23B 51/00* (2006.01)
*B23B 51/12* (2006.01)

(52) U.S. Cl. .......................................... 407/30; 407/40

(58) Field of Classification Search .................. 407/41, 407/49, 94, 30, 33, 44, 40
See application file for complete search history.

(56) References Cited

U.S. PATENT DOCUMENTS

| | | | | | |
|---|---|---|---|---|---|
| 2,484,480 | A | * | 10/1949 | Anderson | 408/181 |
| 2,910,938 | A | * | 11/1959 | McKenzie | 101/377 |
| 3,187,408 | A | * | 6/1965 | Titterud | 407/91 |
| 3,239,911 | A | * | 3/1966 | Williams | 407/79 |
| 3,408,722 | A | * | 11/1968 | Berry, Jr. | 407/46 |
| 3,512,309 | A | * | 5/1970 | Grieco | 451/367 |
| 5,211,516 | A | * | 5/1993 | Kress et al. | 408/231 |
| 6,056,484 | A | * | 5/2000 | Mitchell et al. | 407/36 |

FOREIGN PATENT DOCUMENTS

| | | |
|---|---|---|
| EP | 1 358 960 | 11/2003 |
| GB | 916 112 | 1/1963 |

OTHER PUBLICATIONS

International Search Report PCT/EP2006/00812 and English translation thereof.

* cited by examiner

*Primary Examiner* — Will Fridie, Jr.

(74) *Attorney, Agent, or Firm* — Larry R. Meenan

(57) ABSTRACT

A tool holder, drill holder, reamer holder, and milling cutter holder. The abstract of the disclosure is submitted herewith as required by 37 C.F.R. §1.72(*b*). As stated in 37 C.F.R. §1.72 (*b*): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

16 Claims, 9 Drawing Sheets

TOOL HOLDER, DRILL HOLDER, REAMER HOLDER, AND MILLING CUTTER HOLDER

CONTINUING APPLICATION DATA

This application is a Continuation-In-Part application of International Patent Application No. PCT/EP2006/008812, filed on Sep. 11, 2006, which claims priority from Federal Republic of Germany Patent Application No. 10 2005 051 545.2, filed on Oct. 27, 2005. International Patent Application No. PCT/EP2006/008812 was pending as of the filing date of this application. The United States was an elected state in International Patent Application No. PCT/EP2006/008812.

BACKGROUND

1. Technical Field

This application relates to a tool holder, drill holder, reamer holder, and milling cutter holder.

2. Background Information

The tool holder serves for holding a tool accurately and reliably with as little expenditure as possible. The tool can be, for example, a drill, a milling cutter or a reamer. To fasten the tool on the tool holder, it is placed in the receptacle of the tool holder. Then, the clamping screw is tightened, so that the tool is firmly mounted on the tool holder by means of the clamping screw. The clamping tool for tightening the clamping screw can be, for example, a hexagon wrench or a screw driver.

In the known tool holders, the access opening lies on the longitudinal axis of the clamping screw. Clamping is effected either from the back of the tool holder, i.e. through the shank of the tool holder, or from the front. If the clamping screw is tightened and released from the back, the tool holder will have to be removed from the machine tool whenever the tool shall be exchanged. If the clamping screw is tightened and released from the front, the tool will have to be provided with an access opening extending through its center. In some cases, this is technically impossible. Furthermore, the actuation of the clamping screw from the front will be particularly impractical if the tool consists of several subassemblies placed on top of each other. To remove the entire tool from the tool holder, the tool will have to be taken apart into its subassemblies to release the lowermost clamping screw.

OBJECT OR OBJECTS

An object of at least one possible embodiment of the present application is to provide a tool holder enabling an easier fastening of a tool on the tool holder and enabling an access to the clamping screw without having to disassemble the tool holder or parts of the tool before.

SUMMARY

At least one possible embodiment of the present application teaches a tool holder with an access opening that extends laterally with respect to the longitudinal axis of the clamping screw. This allows an actuation of the clamping screw by means of the clamping tool without having to dismount the tool holder from the machine tool or, in case of a multi piece tool, without having to remove individual assemblies.

In other possible embodiments of the present application, the access opening may extend radially with respect to the longitudinal axis of the clamping screw. This allows to turn the clamping screw by means of the clamping tool in several individual steps by a small angular amount in each case, in order to finally clamp or release the tool.

In at least one possible embodiment example of the present application, it can also be provided that the access opening extends obliquely to the longitudinal axis of the clamping screw. This allows for turning the clamping screw continuously by means of a suitable clamping tool.

In other possible embodiments of the present application, different types of clamping tools or clamping screws could be employed.

Developments of at least one possible embodiment of the present application are described herein.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application will be described by means of the accompanying drawings, in which.

DESCRIPTION OF EMBODIMENT OR EMBODIMENTS

Figure 1:
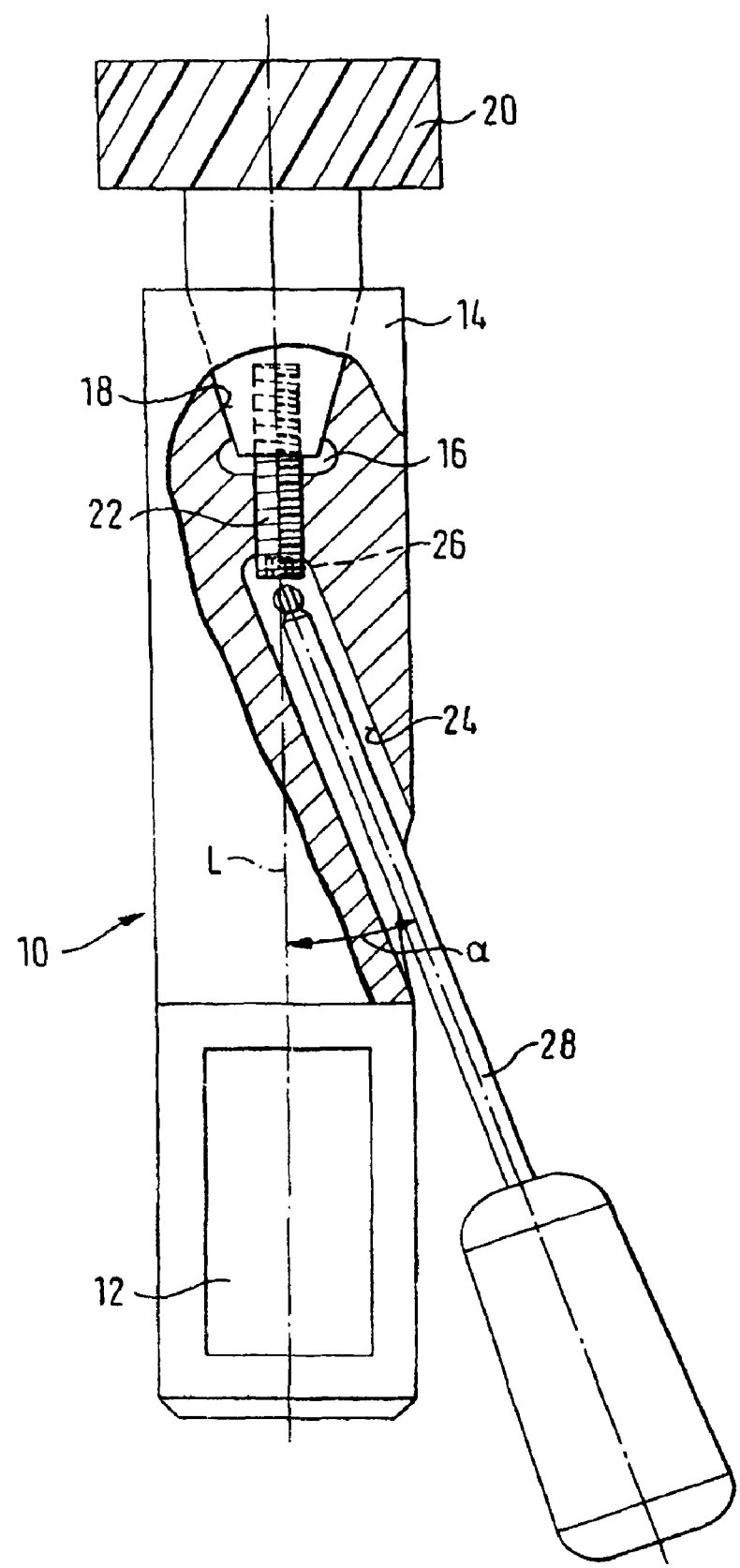
FIG. 1 is a side view, partially in section, of a tool holder according to a first embodiment with a tool inserted therein and a clamping tool.

FIG. 1 shows a tool holder 10 provided to be inserted with one end 12 into a machine tool (not shown). On its other end 14 (in the following referred to as "front end"), a receptacle 16 is provided. The receptacle includes a surface 18 in the shape of a truncated cone, widening from the back to the front and ending on the front face at the front end 14 of the tool holder 10. A tool 20, shown here in schematic representation, is inserted in the receptacle 16 and in the truncated surface 18.

The tool 20 is any tool, used for metal cutting, for example a drill, a milling cutter or a reamer.

A clamping screw 22 is arranged in the bottom of the receptacle 16, protruding on the front side into the receptacle 16 and with its rear end, into an access opening 24. The access opening 24 is designed in the manner of a blind hole and extends from one lateral face of the tool holder 10 obliquely into the center of the tool holder, until it intersects the drill hole in which the clamping screw 22 is arranged. The angle α between the longitudinal axis of the access opening 24 and the longitudinal axis L of the clamping screw 22 lies substantially in the range of 20° to 35°.

Figure 1A:
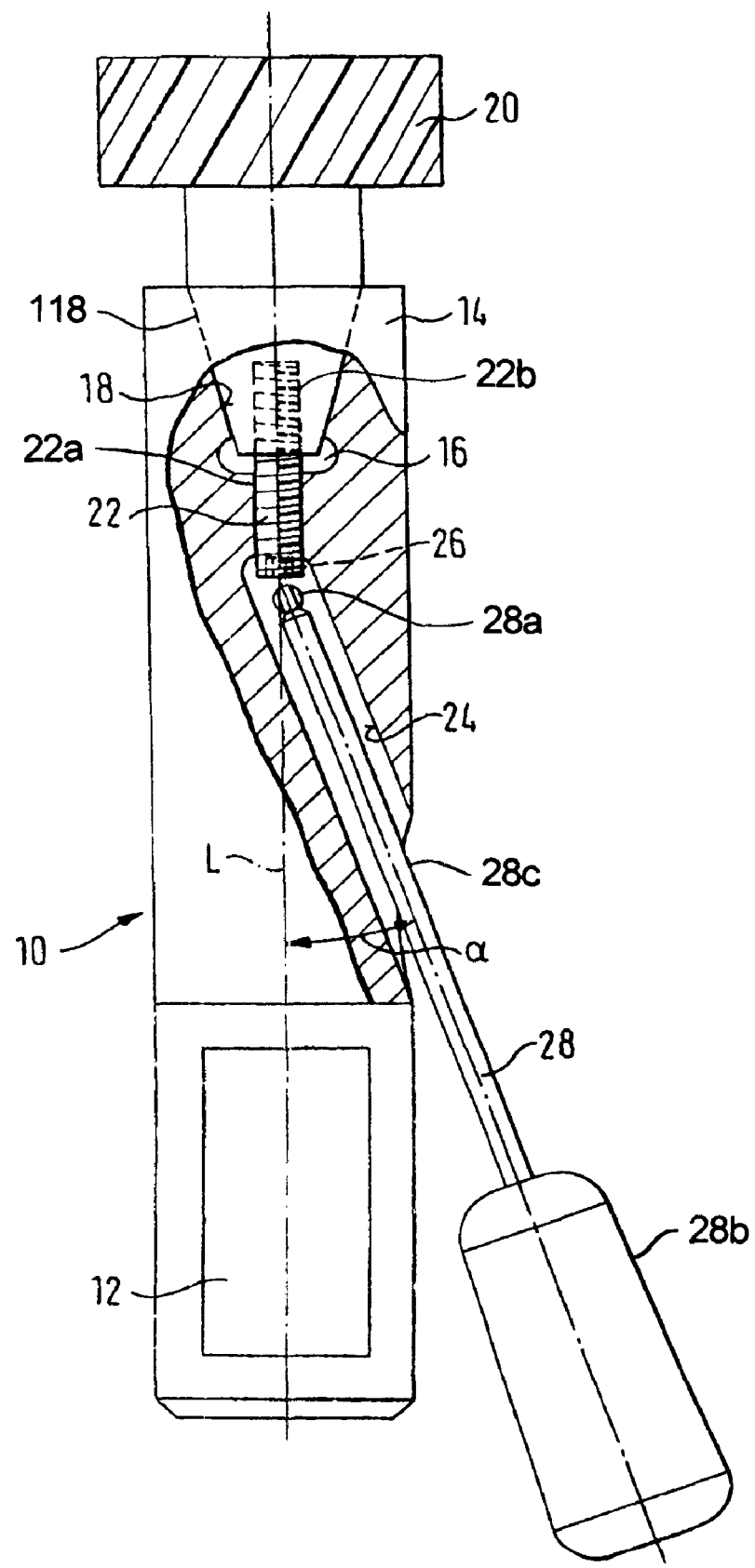
FIG. 1A is a side view, partially in section, of a possible embodiment of a tool holder with a tool inserted therein and a clamping tool.

The clamping screw 22 includes at its rear end an opening 26 formed as a hexagon socket. The shank of the clamping screw 22 can be provided with either a differential thread or a right-hand/left-hand thread. FIG. 1A shows one type of threading 22a and another type of threading 22b, so that the clamping screw 22 has two different threads. In other possible embodiments, the clamping screw may be threaded in another manner.

In other possible embodiments of the present application, the clamping screw could have other possible shapes or openings other than a hexagon socket. In at least one possible embodiment of the present application, the clamping screw could be case-hardened. In at least one possible embodiment of the present application, the clamping screw could have a wear resistant outer surface. In at least one possible embodiment of the present application, the clamping screw could be made of a wear-resistant material, such as alloy steel. In other possible embodiments, the clamping screw could be made of other wear-resistant materials.

If the clamping screw 22 has a differential thread, it will include two threads of identical direction of turn, but of different pitches. One of the two threads engages a counter thread in the tool holder 10, and the other thread engages a counter thread in the tool 20. Due to the different pitches of the two threads, the distance between the tool holder 10 and the tool 20 will change in accordance with the difference between the two pitches, when the clamping screw 22 is turned. In this way, high clamping forces can be applied on the tool 20, with the truncated surface 18 of the receptacle 16 serving for accurate centering and positioning of the tool 20.

If the clamping screw 22 has a right-hand/left-hand thread, it will include two threads of different directions of turn. In this case, too, one of the two threads engages a counter thread in the tool holder 10, and the other thread engages a counter thread in the tool 20. Due to the different directions of turn of the two threads, the distance between the tool holder 10 and the tool 20 will change in accordance with the sum of the two pitches, when the clamping screw 22 is turned. In this way, the tool 20 can be clamped by means of relatively few turns of the clamping screw 22. The pitches of the two threads may either be identical or they may differ in the manner of a differential screw.

For actuation of the clamping screw, a clamping tool 28, with a clamping tool handle 28b and a clamping tool shaft 28c, is provided whose front end includes a hexagon in the shape of a ball head 28a (shown in FIG. 1A). This allows to turn the clamping screw 22 although the clamping tool 28 is applied obliquely to the longitudinal axis L of the clamping screw 22.

Instead of the illustrated clamping tool 28, other embodiments are also possible. For example, in at least one possible embodiment of the present application, a screw driver with a flexible shaft can be used. In other possible embodiments of the present application, it is also imaginable to use a cardan joint or a universal joint at the front end of the clamping tool 28 to be able to turn the clamping screw 22 with an obliquely applied clamping tool. In at least one possible embodiment of the present application, the clamping tool could be case-hardened. In at least one possible embodiment of the present application, the clamping tool could have a wear resistant outer surface. In at least one possible embodiment of the present application, the clamping tool could be made of a wear-resistant material, such as alloy steel. In other possible embodiments, the clamping tool could be made of other wear-resistant materials.

Figure 1B:
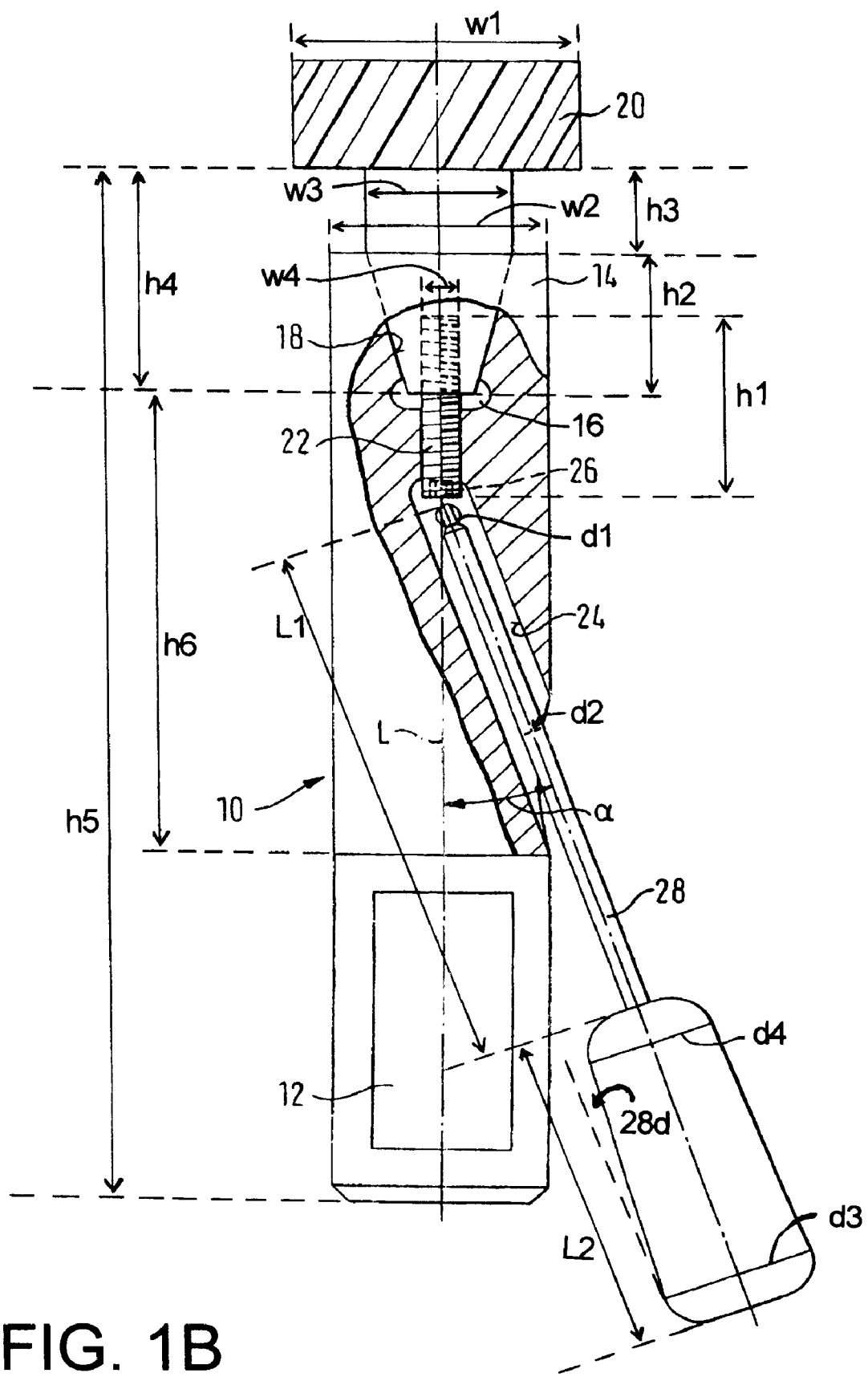
FIG. 1B is a side view, partially in section, of a possible embodiment of a tool holder with a tool inserted therein and a clamping tool.

FIG. 1B shows the following dimensions: clamping screw height h1, truncated surface height h2, tool shank portion h3, tool portion h4, assembled tool holder portion h5, tool holder shank portion h6, tool first width w1, tool holder width w2, tool second width w3, opening of clamping screw width w4, clamping tool shaft length L1, clamping tool handle length L2, ball-head diameter d1, clamping tool shaft diameter d2, clamping tool handle first diameter d3, clamping tool handle second diameter d4, and clamping tool handle taper angle 28d.

In a relationship wherein the clamping screw height h1 is equal to 100%, the following applies: truncated surface height h2 is approximately equal to 75% of the clamping screw height h1, the tool shank portion h3 is equal to approximately 46% of the clamping screw height h1, the tool portion h4 is approximately equal to 118% of the clamping screw height h1, the assembled tool holder portion h5 is approximately equal to 554% of the clamping screw height h1, and the tool holder shank portion h6 is approximately equal to 246% of the clamping screw height h1. In a relationship wherein the tool first width w1 is equal to 100%, the following applies: the tool holder width w2 is approximately equal to 78% of the tool first width w1, the tool second width w3 is approximately equal to 51% of the tool first width w1, and the opening of clamping screw width w4 is approximately equal to 15% of the tool first width w1. In a relationship wherein the clamping tool shaft length L1 is equal to 100%, the clamping tool handle length L2 is approximately equal to 61% of the clamping tool shaft length L1. In a relationship wherein the ball-head diameter d1 is equal to 100%, the following applies: the clamping tool shaft diameter d2 is approximately equal to the ball-head diameter d1, the clamping tool handle first diameter d3 is approximately equal to 629% of the ball-head diameter d1, and the clamping tool handle second diameter d4 is approximately equal to 529% of the ball-head diameter d1. In other possible embodiments, the measurements may possibly vary from those listed above by one percent increments, possibly anywhere from possibly as much as plus 50 percent to possibly minus 25 percent. The clamping tool handle taper angle 28d represents a slight taper from the clamping tool handle first diameter d3 to the clamping tool handle second diameter d4.

Figure 2:
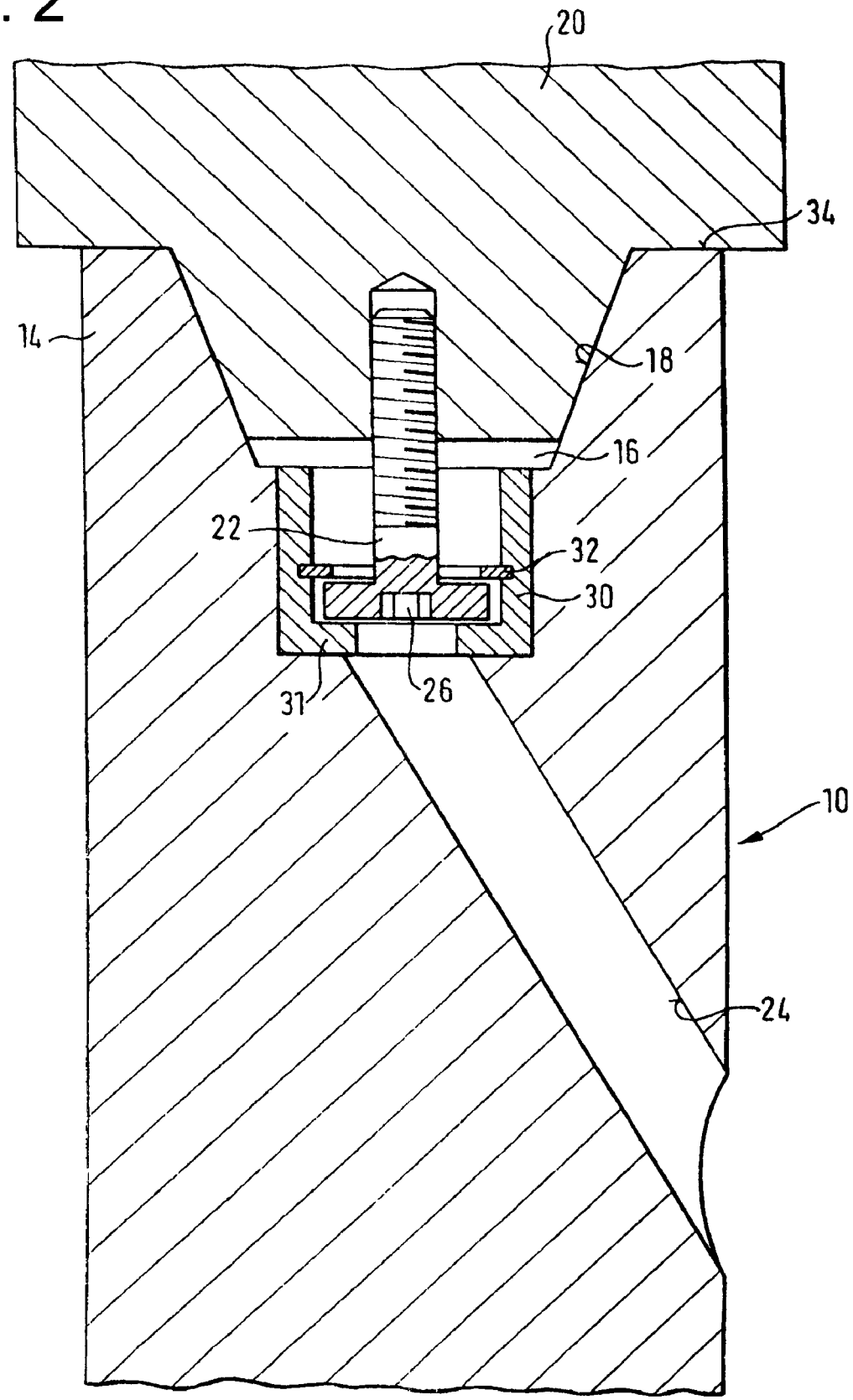
FIG. 2 is a broken section of a tool holder according to a second embodiment.

FIG. 2 shows a second embodiment. The components known from the first embodiment are identified by the same reference numbers and in so far, reference is made to the above explanations.

Contrary to the first embodiment, the clamping screw 22 of the second embodiment has a continuous thread. In other possible embodiments of the present application, the clamping screw 22 may be threaded in another manner. The clamping screw 22 is in this case rotatably carried in the tool holder 10, but not connected with the tool holder via a thread; the thread exclusively exists in the tool 20. To position the clamping screw 22 in axial direction, a holding sleeve 30 with a collar 31 and a locking ring 32 are provided, between which the head of the clamping screw 22 is positioned.

Another difference from the first embodiment is that in the second embodiment, the front face of the front end 14 is designed as a plane bearing face 34. This bearing face 34, in combination with the truncated surface 18 of the receptacle 16, serves for a substantially precise positioning of the tool 20 on the tool holder 10.

In the second embodiment, too, the clamping tool is inserted through the obliquely extending access opening 24, until it engages the opening 26 of the clamping screw 22. The continuous thread of the clamping screw 22 may be a left-hand thread. In other possible embodiments of the present application, the clamping screw may be threaded in a different manner. Contrary to the first embodiment, the axial position of the screw head does not change in the second embodiment, when the clamping screw 22 is tightened or released.

Figure 3:
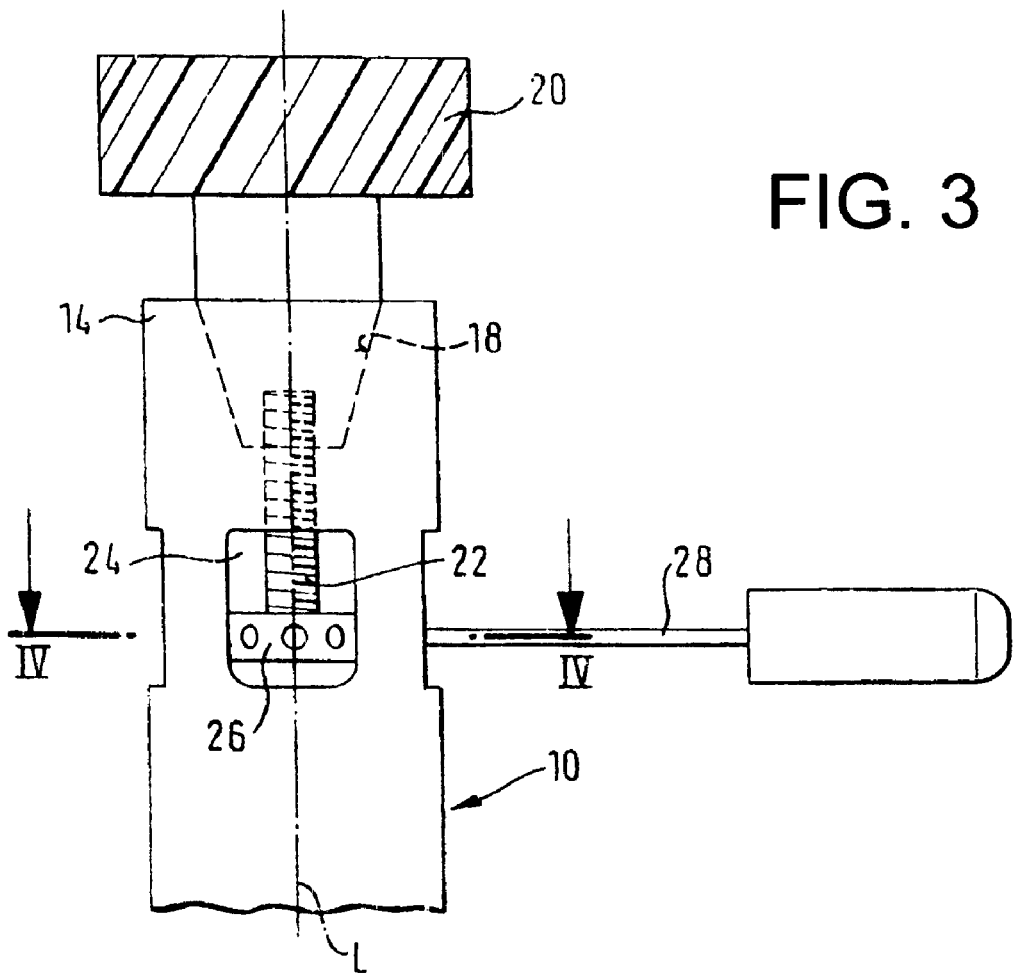
FIG. 3 is a side view of a tool holder according to a third embodiment with a tool inserted therein.
Figure 4:
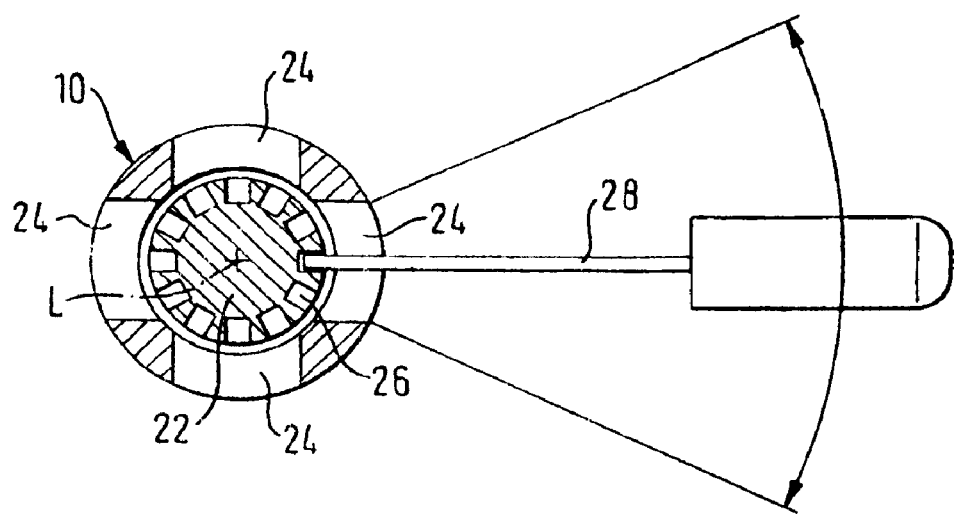
FIG. 4 is a section along the plane IV-IV of FIG. 3.

FIGS. 3 and 4 show a third embodiment. The essential difference from the first and second embodiments is that several access openings are provided and that the access openings extend in radial direction. Accordingly, the clamping tool 28 is applied approximately at right angles with the longitudinal axis L. In the embodiment shown, four access openings are used, arranged opposite each other in pairs. The clamping screw 22 includes several openings 26, distributed uniformly on its circumference. Therefore, the clamping tool 28 can be inserted through one of the access openings 24 into an opening 26 of the clamping screw, the opening 26 being located behind the access opening 24, and can then be moved in circumferential direction about the axis L, carrying along the clamping screw 22 accordingly. Once the clamping tool 28 touches the rim of the access opening 24, it will be withdrawn from the opening 26 and newly inserted into another access opening. The clamping screw 22 can then be turned further.

In the third embodiment, too, the clamping screw may include a differential thread, a right-hand/left-hand thread or else a continuous thread.

Figure 5:
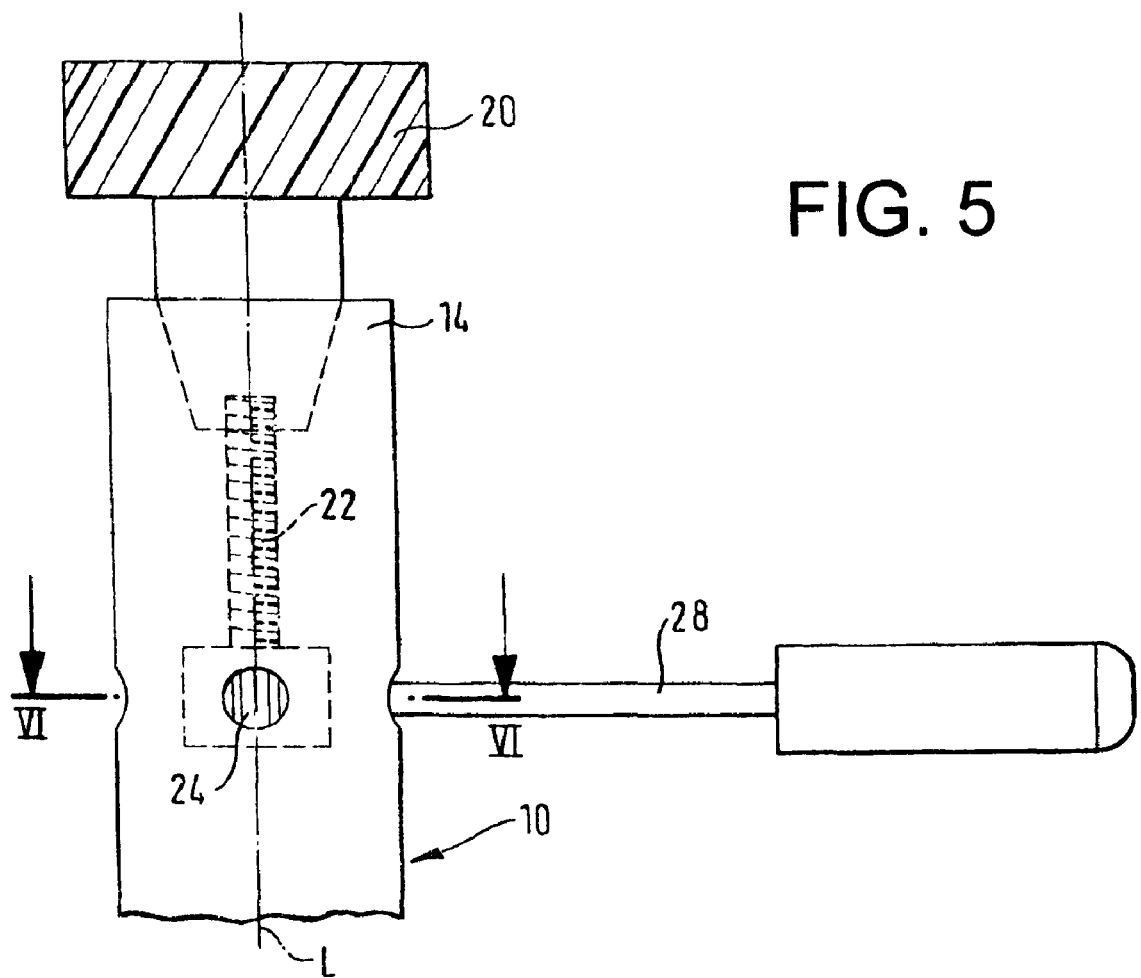
FIG. 5 is a side view of a tool holder according to a fourth embodiment with a tool inserted therein.
Figure 6:
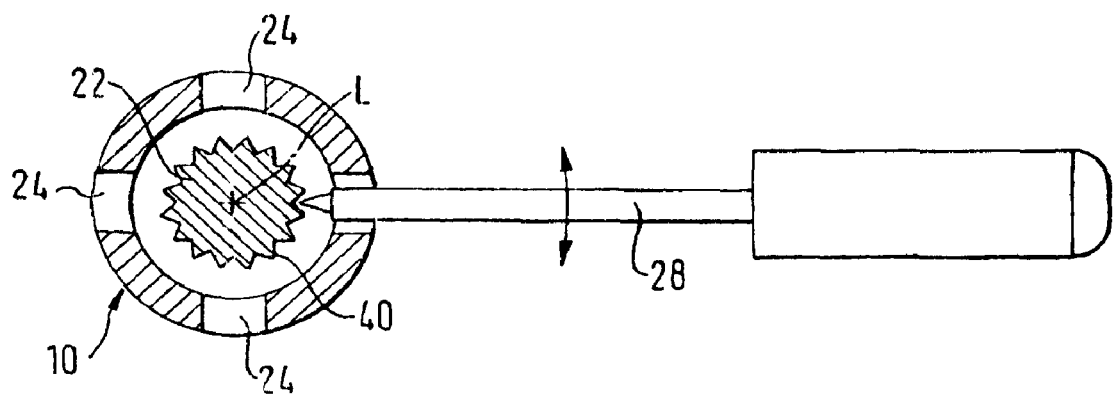
FIG. 6 is a section along the plane VI-VI of FIG. 5.

FIGS. 5 and 6 show a fourth embodiment. The components known from the preceding embodiments are identified by the same reference numbers and in so far, reference is made to the above explanations.

In the fourth embodiment, too, several radially extending access openings 24 are used. Contrary to the third embodiment, the clamping screw includes several teeth 40 on its outer circumference, on which the clamping tool 28 can act in the manner of a ratchet.

In some embodiments of the present application, the tool holder could be used for light-duty drills, milling cutters, reamers, or other tools of the like.

Figure 7:
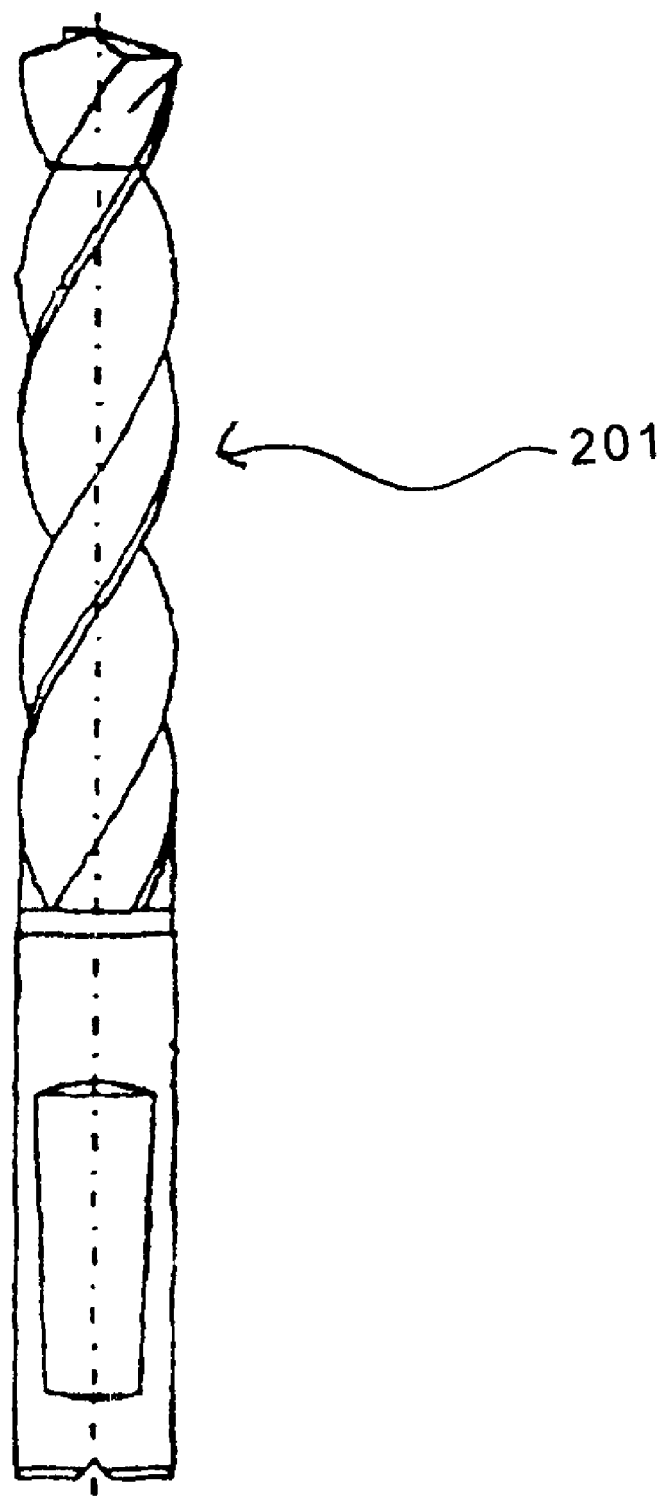
FIG. 7 is a drill according to one possible embodiment.

FIG. 7 shows a drill 201 that may be used in at least one possible embodiment of the present application.

Figure 8:
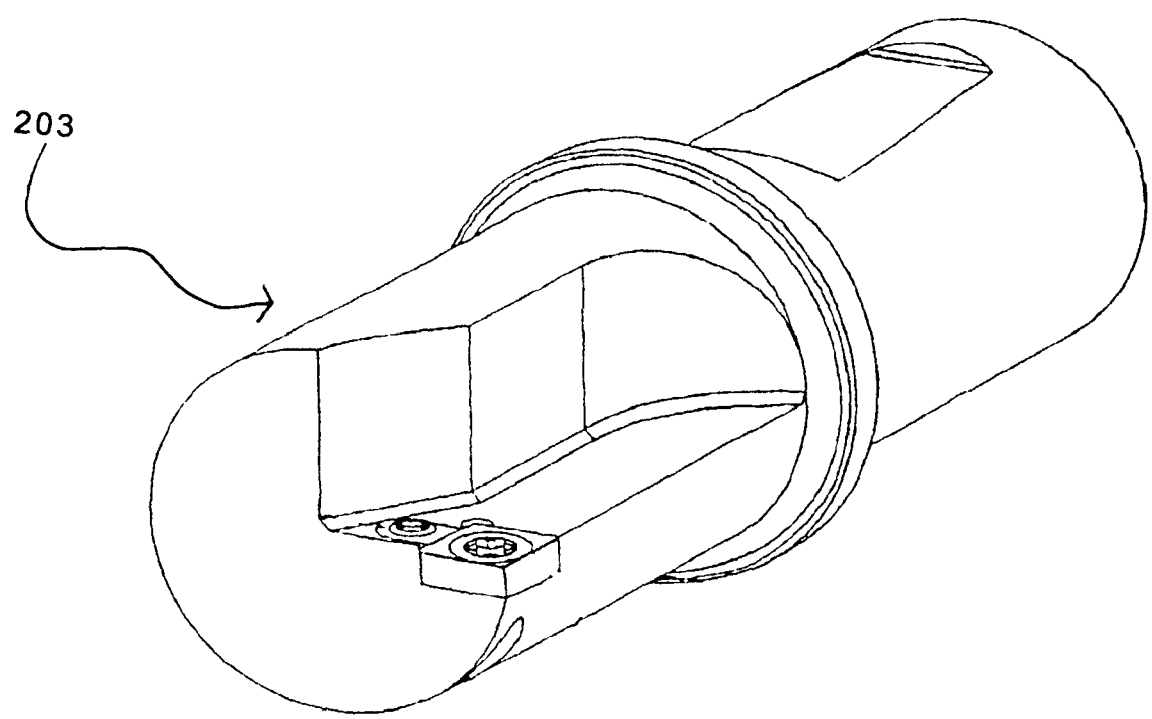
FIG. 8 is a reamer according to one possible embodiment.

FIG. 8 shows a reamer 203 that may be used in at least one possible embodiment of the present application.

Figure 9:
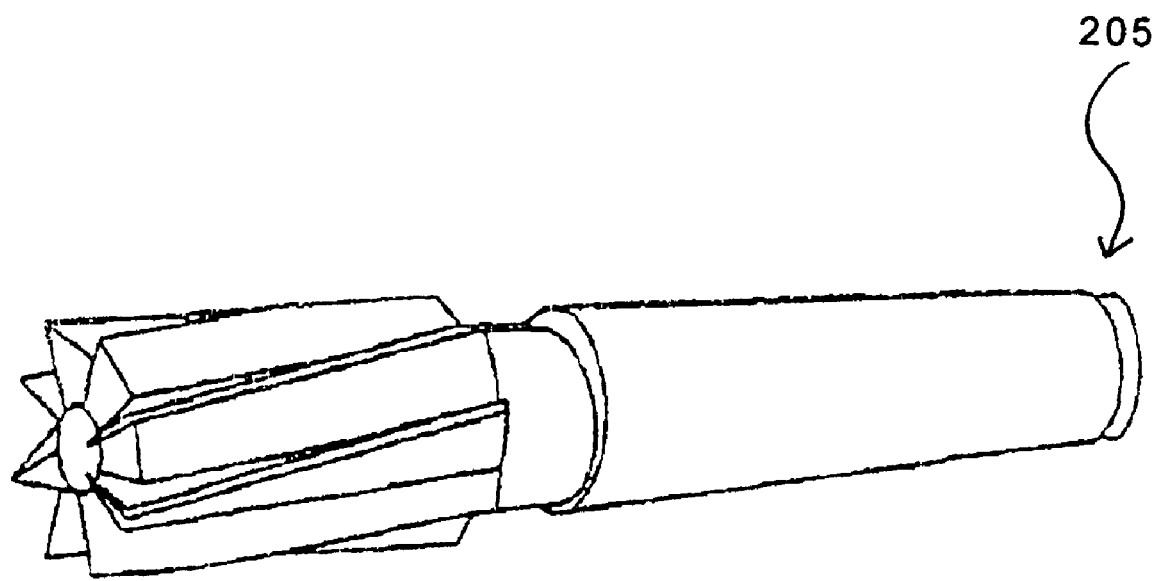
FIG. 9 is an endmill according to one possible embodiment.

FIG. 9 shows an endmill 205 that may be used in at least one possible embodiment of the present application.

A further feature or aspect of an embodiment is believed at the time of the filing of this patent application to possibly reside broadly in the tool holder, wherein the tool 20 is a drill, a milling cutter or a reamer.

One feature or aspect of an embodiment is believed at the time of the filing of this patent application to possibly reside broadly in a drill holder being configured to hold a drill with a conical shank and a threaded hole in a conical shank during drilling, said drill holder comprising: a longitudinal axis; a front end comprising a conical receptacle portion being configured to receive a drill with a conical shank; a rear end being disposed opposite to said front end and being configured to be inserted into a machine; a threaded screw being configured to engage a threaded hole in a conical shank of a drill; a threaded axial hole being disposed in the longitudinal center of said drill holder and being configured and disposed to receive said threaded screw; said threaded screw comprising a multi-sided hole in an end facing away from said front end of said drill holder; an access opening being disposed at an acute angle with respect to the longitudinal axis; an adjusting tool being configured to enter said access opening comprising: a handle; a substantially ball-shaped head structure configured to fit into said multi-sided hole of said screw sufficient to permit said adjusting tool to turn said screw and to tighten a drill with a conical shank and a threaded hole in a conical shank into said conical receptacle portion of said drill holder to hold the drill in place securely during drilling; and said tool handle being sufficiently large to permit a user to grip said tool handle, to turn said screw, and to tighten a drill with a conical shank and a threaded hole in a conical shank into said conical receptacle portion of said drill holder; said threaded screw and said threaded axial hole of said drill holder and the threaded hole of a drill with a conical shank and a threaded hole in a conical shank each comprising threading having a thread pitch to provide sufficient mechanical advantage to turn said threaded screw in said axial hole and in a drill with a conical shank and a threaded hole in a conical shank to tighten the drill into said conical receptacle portion of said drill holder; the acute angle of said access opening being sufficiently large to permit manual adjustment of said adjusting tool by the hand of a user; and the acute angle of said access opening being sufficiently small to permit said substantially ball-shaped head structure of said adjusting tool to enter said access opening and to engage and turn said threaded screw to tighten a drill with a conical shank and a threaded hole in a conical shank into said conical receptacle portion of said drill holder and also to permit sufficient clearance for manual adjustment of said adjusting tool by the hand of a user.

Some examples of ball head hexagon screwdrivers that may possibly be utilized or adapted for use in at least one possible embodiment are as follows: ProHold Tip with ProGuard finish, Balldriver Tip with ProGuard finish, Balldriver Tip with BriteGuard finish, Balldriver Tip with GoldGuard finish, all manufactured by Bondhus Corporation, located at 1400 E. Broadway, P.O. Box 660, Monticello, Minn. 55362 USA; and Ball End Precision Hex Tools 26413 to 26439, Precision Hex Ball End—8 Pc Set In Pouch, Metric Ball End Precision Hex 26413 to 26440, and Precision 5 Piece Set Ball Point Metric Hex, Metric Ball End Pico Soft Grip 26441 to 26449, 3K—Ball End Hex With Soft Panel Grips 46702 to 46728, all manufactured by Wiha Quality Tools LLC located at 1348 Dundas Circle, Monticello Minn. 55362 USA.

Another feature or aspect of an embodiment is believed at the time of the filing of this patent application to possibly reside broadly in the drill holder, including all of (A), (B), (C), (D), (E), (F), and (G) wherein (A), (B), (C), (D), (E), (F), and (G) comprise the following: (A) said access opening extends from said conical receptacle portion towards said rear end of said drill holder and said access opening is configured to face the machine for rotating said drill holder; (B) said access opening comprises a longitudinal axis; said clamping screw comprises a longitudinal axis; and the angle between the longitudinal axis of said access opening and the longitudinal axis of said clamping screw lies in the range of 20° to 34°; (C) said clamping screw includes an axially directed opening into which said clamping tool can be inserted; (D) said opening is a hexagon socket; (E) said clamping screw includes a differential thread; (F) said clamping screw includes a right-hand/left-hand thread; and (G) said two threads have different pitches.

At least one possible embodiment of the present application relates to a tool holder having a receptacle for a tool, a clamping screw, by means of which the tool can be fastened to the tool holder, and an access opening through which a clamping tool can act on the clamping screw.

Yet another feature or aspect of an embodiment is believed at the time of the filing of this patent application to possibly reside broadly in a rotary tool holder in combination with its rotary tool, said rotary tool holder being configured and disposed to hold, during use, said rotary tool, which has a conical shank and a threaded hole in said conical shank, said rotary tool holder comprising: a longitudinal axis; a front end comprising a conical receptacle portion being configured and disposed to receive and hold said conical shank of said rotary tool; a rear end being disposed opposite to said front end and being configured to be inserted into a machine; a threaded screw being configured to engage and being engaged in said threaded hole of said rotary tool; a threaded axial hole being disposed in the central portion of said rotary tool holder and being configured to receive and receiving said threaded screw; said threaded screw comprising a multi-sided hole in an end facing away, during use, from said front end of said rotary tool holder; an access opening being disposed at an acute angle with respect to the longitudinal axis; an adjusting tool being configured to enter said access opening, and said adjusting tool comprising: a handle; a substantially ball-shaped head structure being configured to fit into said multi-sided hole of said screw sufficient to permit said adjusting tool to turn said screw and to tighten said conical shank of said rotary tool into said conical receptacle portion of said rotary tool holder to hold said rotary tool in place securely during use; and said tool handle being sufficiently large to permit a user to grip said tool handle, to turn said screw, and to tighten said conical shank of said rotary tool into said conical receptacle portion of said rotary tool holder; said threaded screw and said threaded axial hole of said rotary tool holder and said threaded hole of said rotary tool each comprising threading having a thread pitch to provide sufficient mechanical advantage to turn said threaded screw in said axial hole and in said threaded hole of said rotary tool to tighten said conical shank of said rotary tool into said conical receptacle portion of said rotary tool holder; the angle of said access opening being sufficiently large to permit manual adjustment of said adjusting tool by the hand of a user; and the acute angle of said access opening being sufficiently small to permit said substantially ball-shaped head structure of said adjusting tool to enter said access opening and to engage and turn said threaded screw to tighten said conical shank of said rotary tool into said conical receptacle portion of said rotary tool holder and also to permit sufficient clearance for manual adjustment of said adjusting tool by the hand of a user.

One feature or aspect of an embodiment is believed at the time of the filing of this patent application to possibly reside broadly in a tool holder 10 having a receptacle 16 for a tool 20, a clamping screw 22, by means of which the tool 20 can be fastened to the tool holder 10, and an access opening 24 through which a clamping tool 28 can act on the clamping screw 22, wherein the access opening 24 extends laterally with respect to the longitudinal axis L of the clamping screw 22.

The components disclosed in the various publications, disclosed or incorporated by reference herein, may possibly be used in possible embodiments of the present invention, as well as equivalents thereof.

Still another feature or aspect of an embodiment is believed at the time of the filing of this patent application to possibly reside broadly in a rotational tool holder having a receptacle for a tool, a clamping screw, by means of which the tool can be fastened to the rotational tool holder, and an access opening through which a clamping tool can act on the clamping screw, wherein the access opening extends laterally with respect to the longitudinal axis of the clamping screw.

U.S. patent application Ser. No. 09/927,921, filed on Aug. 10, 2001, having inventors Bernhard Walter BORSCHERT, Dieter Hermann MUHLFRIEDEL, Karl-Heinz WENDT, corresponding Federal Republic of Germany Patent Application No. 199 05 735, and title "DRILL FOR DRILLING, A METHOD FOR MAKING A DRILL FOR DRILLING, AND A CUTTING TOOL" is hereby incorporated by reference as if set forth in its entirety herein.

U.S. patent application Ser. No. 10/394,500, filed on Mar. 21, 2003, having inventors Horst JAGER and Berthold ZEUG, corresponding Federal Republic of Germany Patent Application No. 100 47 079, and title "REAMER WITH CLAMPING ARRANGEMENT FOR ADJUSTING CUTTING INSERT AND OTHER CUTTING TOOLS WITH CLAMPING ARRANGEMENTS FOR ADJUSTING CUTTING INSERTS" is hereby incorporated by reference as if set forth in its entirety herein.

U.S. patent application Ser. No. 11/611,589, filed on Dec. 15, 2006, having inventor Vladimir VOLOKH, corresponding Israel Patent Application No. 162587, and title "END MILL AND A METHOD OF OPERATING AN END MILL" is hereby incorporated by reference as if set forth in its entirety herein.

Another feature or aspect of an embodiment is believed at the time of the filing of this patent application to possibly reside broadly in the tool holder, wherein the access opening 24 extends radially to the longitudinal axis L of the clamping screw 22.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Yet another feature or aspect of an embodiment is believed at the time of the filing of this patent application to possibly reside broadly in the tool holder, wherein the clamping screw includes a head with several openings 26 into each of which a clamping tool 28 can be inserted.

The appended drawings in their entirety, including all dimensions, proportions and/or shapes in at least one embodiment of the invention, are accurate and are hereby included by reference into this specification.

Still another feature or aspect of an embodiment is believed at the time of the filing of this patent application to possibly reside broadly in the tool holder, wherein the clamping screw 22 includes a head with several teeth 40 on each of which a clamping tool 28 can act.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

A further feature or aspect of an embodiment is believed at the time of the filing of this patent application to possibly reside broadly in the tool holder, wherein the access opening 24 extends obliquely to the longitudinal axis L of the clamping screw 22.

All, or substantially all, of the components and methods of the various embodiments may be used with at least one embodiment or all of the embodiments, if more than one embodiment is described herein.

Another feature or aspect of an embodiment is believed at the time of the filing of this patent application to possibly reside broadly in the tool holder, wherein the access opening 24 extends from the receptacle 16 towards the rear.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Yet another feature or aspect of an embodiment is believed at the time of the filing of this patent application to possibly reside broadly in the tool holder, wherein the angle α between the longitudinal axis of the access opening 24 and the longitudinal axis L of the clamping screw 22 lies in the range of 20° to 34°.

All of the patents, patent applications and publications recited herein, and in the Declaration attached hereto, are hereby incorporated by reference as if set forth in their entirety herein.

Still another feature or aspect of an embodiment is believed at the time of the filing of this patent application to possibly reside broadly in the tool holder, wherein the clamping screw 22 includes an axially directed opening 26 into which a clamping tool 28 can be inserted.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

A further feature or aspect of an embodiment is believed at the time of the filing of this patent application to possibly reside broadly in the tool holder, wherein the opening 26 is a hexagon socket.

It will be understood that any or all the examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

Yet another feature or aspect of an embodiment is believed at the time of the filing of this patent application to possibly reside broadly in the tool holder, wherein the receptacle includes a plane bearing face 34 for the tool 20.

The sentence immediately above relates to patents, published patent applications and other documents either incorporated by reference or not incorporated by reference.

Still another feature or aspect of an embodiment is believed at the time of the filing of this patent application to possibly reside broadly in the tool holder, wherein a tool 20 is arranged in the receptacle 16.

All of the patents, patent applications or patent publications, which were cited in the International Search Report dated Nov. 29, 2006 and/or cited elsewhere are hereby incorporated by reference as if set forth in their entirety herein as follows: EP 1 358 960 A1 and GB 916 112 A.

The corresponding foreign and international patent publication applications, namely, Federal Republic of Germany Patent Application No. 10 2005 051 545.2, filed on Oct. 27, 2005, having inventors Bernhard BORSCHERT and Friedrich OBERLÄNDER, and DE-OS 10 2005 051 545.2 and DE-PS 10 2005 051 545.2, and International Application No. PCT/EP2006/008812, filed on Sep. 11, 2006, having WIPO Publication No. WO2007/048467 and inventors Bernhard BORSCHERT and Friedrich OBERLÄNDER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Another feature or aspect of an embodiment is believed at the time of the filing of this patent application to possibly reside broadly in the tool holder, wherein the clamping screw 22 includes a differential thread.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Yet another feature or aspect of an embodiment is believed at the time of the filing of this patent application to possibly reside broadly in the tool holder, wherein the clamping screw 22 includes a right-hand/left-hand thread.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Still another feature or aspect of an embodiment is believed at the time of the filing of this patent application to possibly reside broadly in the tool holder, wherein the two threads have different pitches.

The details in the patents, patent applications and publications may be considered to be incorporable, at applicant's option, into the claims during prosecution as further limitations in the claims to patentably distinguish any amended claims from any applied prior art.

A further feature or aspect of an embodiment is believed at the time of the filing of this patent application to possibly reside broadly in the tool holder, wherein the clamping screw 22 includes a continuous left-hand thread.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Another feature or aspect of an embodiment is believed at the time of the filing of this patent application to possibly reside broadly in the tool holder, wherein the receptacle 16 has the shape of a truncated cone.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A drill holder being configured to hold a drill with a conical shank and a threaded hole in a conical shank during drilling, said drill holder comprising:

a longitudinal axis;

a front end comprising a conical receptacle portion being configured to receive a drill with a conical shank;

a rear end being disposed opposite to said front end and being configured to be inserted into a machine;

a threaded screw being configured to engage a threaded hole in a conical shank of a drill;

a threaded axial hole being disposed in the longitudinal center of said drill holder and being configured and disposed to receive said threaded screw;

said threaded screw comprising a multi-sided hole in an end facing away from said front end of said drill holder;

an access opening being disposed at an acute angle with respect to the longitudinal axis;

an adjusting tool being configured to enter said access opening comprising:

a handle;

a substantially ball-shaped head structure configured to fit into said multi-sided hole of said screw sufficient to permit said adjusting tool to turn said screw and to tighten a drill with a conical shank and a threaded hole in a conical shank into said conical receptacle portion of said drill holder to hold the drill in place securely during drilling; and said tool handle being sufficiently large to permit a user to grip said tool handle, to turn said screw, and to tighten a drill with a conical shank and a threaded hole in a conical shank into said conical receptacle portion of said drill holder;

said threaded screw and said threaded axial hole of said drill holder and the threaded hole of a drill with a conical shank and a threaded hole in a conical shank each comprising threading having a thread pitch to provide sufficient mechanical advantage to turn said threaded screw in said axial hole and in a drill with a conical shank and a threaded hole in a conical shank to tighten the drill into said conical receptacle portion of said drill holder;

the acute angle of said access opening being sufficiently large to permit manual adjustment of said adjusting tool by the hand of a user; and the acute angle of said access opening being sufficiently small to permit said substantially ball-shaped head structure of said adjusting tool to enter said access opening and to engage and turn said threaded screw to tighten a drill with a conical shank and a threaded hole in a conical shank into said conical receptacle portion of said drill holder and also to permit sufficient clearance for manual adjustment of said adjusting tool by the hand of a user.

2. The drill holder according to claim 1, including all of (A), (B), (C), (D), (E), (F), and (G) wherein (A), (B), (C), (D), (E), (F), and (G) comprise the following:

(A) said access opening extends from said conical receptacle portion towards said rear end of said drill holder and said access opening is configured to face the machine for rotating said drill holder;

(B) said access opening comprises a longitudinal axis;

said clamping screw comprises a longitudinal axis; and the angle between the longitudinal axis of said access opening and the longitudinal axis of said clamping screw lies in the range of 20° to 34';

(C) said clamping screw includes an axially directed opening into which said clamping tool can be inserted;

(D) said opening is a hexagon socket;

(E) said clamping screw includes a differential thread;

(F) said clamping screw includes a right-hand/left-hand thread;

and (G) said two threads have different pitches.

3. A rotary tool holder in combination with its rotary tool, said rotary tool holder being configured and disposed to hold, during use, said rotary tool, which has a conical shank and a threaded hole in said conical shank, said rotary tool holder comprising:
a longitudinal axis;
a front end comprising a conical receptacle portion being configured and disposed to receive and hold said conical shank of said rotary tool;
a rear end being disposed opposite to said front end and being configured to be inserted into a machine;
a threaded screw being configured to engage and being engaged in said threaded hole of said rotary tool;
a threaded axial hole being disposed in the central portion of said rotary tool holder and being configured to receive and receiving said threaded screw;
said threaded screw comprising a multi-sided hole in an end facing away, during use, from said front end of said rotary tool holder;
an access opening being disposed at an acute angle with respect to the longitudinal axis;
an adjusting tool being configured to enter said access opening, and said adjusting tool comprising:
a handle;
a substantially ball-shaped head structure being configured to fit into said multi-sided hole of said screw sufficient to permit said adjusting tool to turn said screw and to tighten said conical shank of said rotary tool into said conical receptacle portion of said rotary tool holder to hold said rotary tool in place securely during use; and
said tool handle being sufficiently large to permit a user to grip said tool handle, to turn said screw, and to tighten said conical shank of said rotary tool into said conical receptacle portion of said rotary tool holder;
said threaded screw and said threaded axial hole of said rotary tool holder and said threaded hole of said rotary tool each comprising threading having a thread pitch to provide sufficient mechanical advantage to turn said threaded screw in said axial hole and in said threaded hole of said rotary tool to tighten said conical shank of said rotary tool into said conical receptacle portion of said rotary tool holder;
the angle of said access opening being sufficiently large to permit manual adjustment of said adjusting tool by the hand of a user; and
the acute angle of said access opening being sufficiently small to permit said substantially ball-shaped head structure of said adjusting tool to enter said access opening and to engage and turn said threaded screw to tighten said conical shank of said rotary tool into said conical receptacle portion of said rotary tool holder and also to permit sufficient clearance for manual adjustment of said adjusting tool by the hand of a user.

4. A tool rotating arrangement comprising:
a tool holding body comprising a receptacle and an access area;
said receptacle being configured to receive a tool therein;
said tool holding body being configured to be inserted into a drive arrangement configured to rotate said tool holding body;
a clamping screw being disposed in said tool holding body and being configured to retain a tool in said receptacle;
said access area being configured to permit a clamping tool to approach and engage said clamping screw at a non-zero angle with respect to the longitudinal axis of said clamping screw;
said access opening is configured to solely permit a clamping tool to approach and engage the clamping screw at solely an angle greater than zero degrees and substantially less than ninety degrees with respect to the longitudinal axis of the clamping screw; and
said clamping screw is configured and disposed to contact a tool upon insertion in said receptacle.

5. A tool rotating arrangement comprising:
a tool holding body comprising a receptacle and an access area;
said receptacle being configured to receive a tool therein;
said tool holding body being configured to be inserted into a drive arrangement configured to rotate said tool holding body;
a clamping screw being disposed in said tool holding body and being configured to retain a tool in said receptacle;
said access area being configured to permit a clamping tool to approach and engage said clamping screw at a non-zero angle with respect to the longitudinal axis of said clamping screw;
said access opening is configured to permit a clamping tool to engage said clamping screw in solely a substantially radial direction with respect to the longitudinal axis of said clamping screw; and
said clamping screw comprises a plurality of openings configured to be engaged by a clamping tool to permit adjustment of said clamping screw.

6. The tool rotating arrangement according to claim 5, wherein:
said clamping screw comprises a threaded shaft and a head connected to said threaded shaft; and
said openings in said clamping screw are disposed in said head and substantially radially with respect to the longitudinal axis of said clamping screw.

7. The tool rotating arrangement according to claim 6, in combination with a cutting tool, said cutting tool being disposed in said receptacle, and said cutting tool comprising one of: a drill, a milling cutter, and a reamer.

8. A tool rotating arrangement comprising:
a tool holding body comprising a receptacle and an access area;
said receptacle being configured to receive a tool therein;
said tool holding body being configured to be inserted into a drive arrangement configured to rotate said tool holding body;
a clamping screw being disposed in said tool holding body and being configured to retain a tool in said receptacle;
said access area being configured to permit a clamping tool to approach and engage said clamping screw at a non-zero angle with respect to the longitudinal axis of said clamping screw;
said access opening is configured to permit a clamping tool to engage said clamping screw in solely a substantially radial direction with respect to the longitudinal axis of said clamping screw; and
said clamping screw comprises a plurality of teeth configured to be engaged by a clamping tool to permit adjustment of said clamping screw.

9. The tool rotating arrangement according to claim 8, wherein:
said clamping screw comprises a threaded shaft and a head connected to said threaded shaft; and
said teeth of said clamping screw are disposed on said head and substantially radially with respect to the longitudinal axis of said clamping screw.

10. The tool rotating arrangement according to claim 9, in combination with a cutting tool, said cutting tool being disposed in said receptacle, and said cutting tool comprising one of: a drill, a milling cutter, and a reamer.

11. The tool rotating arrangement according to claim 4, wherein said access area comprises an access opening configured to solely permit a clamping tool to approach and engage said clamping screw at solely an angle substantially greater than zero degrees with respect to the longitudinal axis of said clamping screw.

12. The tool rotating arrangement according to claim 11, wherein said access opening is configured to solely permit an elongated clamping tool to approach and engage said clamping screw at an angle in the range of 20 to 34 degrees with respect to the longitudinal axis of said clamping screw, which angle is defined by the longitudinal axis of the elongated clamping tool and a line extending from the end of said clamping screw to be engaged by the elongated clamping tool, and which line extending coaxially with respect to the longitudinal axis of said clamping screw.

13. The tool rotating arrangement according to claim 12, wherein:
- said tool holding body comprises a first end portion and a second end portion opposite said first end portion;
- said receptacle is disposed in said first end portion;
- said second end portion is configured to be held by a machine for rotating said tool holding body;
- said access opening comprises an elongated blind hole extending through a portion of said tool holding body; and
- said blind hole extends from a mouth disposed on the outer surface of said tool holding body adjacent to said second end portion to said clamping screw inside said tool holding body and adjacent said first end portion.

14. The tool rotating arrangement according to claim 13, wherein:
- said clamping screw comprises an axially directed opening into which the end of a clamping tool can be inserted, which said opening comprises a hexagon socket;
- said receptacle has the shape of a truncated cone; and
- said receptacle comprises a plane bearing face for a tool.

15. The tool rotating arrangement according to claim 14, wherein said clamping screw comprises one of:
- a differential thread;
- a right-hand/left-hand thread, which said two threads have different pitches; and
- a continuous left-hand thread.

16. The tool rotating arrangement according to claim 15, in combination with a cutting tool, said cutting tool being disposed in said receptacle, and said cutting tool comprising one of: a drill, a milling cutter, and a reamer.

\* \* \* \* \*